United States Patent
Lee et al.

(10) Patent No.: US 10,331,023 B1
(45) Date of Patent: Jun. 25, 2019

(54) MULTI-PROJECTION SCREENING SYSTEM AND METHOD USING POLYMER-DISPERSED LIQUID CRYSTAL PANEL

(71) Applicant: CJ CGV CO., LTD., Seoul (KR)

(72) Inventors: Du Hui Lee, Suwon-si (KR); Kyung Yoon Jang, Seoul (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 15/856,228

(22) Filed: Dec. 28, 2017

(30) Foreign Application Priority Data

Dec. 18, 2017 (KR) .................. 10-2017-0174536

(51) Int. Cl.
| | |
|---|---|
| *G03B 21/60* | (2014.01) |
| *H04N 9/31* | (2006.01) |
| *G03B 21/56* | (2006.01) |
| *G02F 1/1334* | (2006.01) |
| *G02F 1/1335* | (2006.01) |

(52) U.S. Cl.
CPC .......... *G03B 21/60* (2013.01); *G02F 1/1334* (2013.01); *G02F 1/133502* (2013.01); *G03B 21/567* (2013.01); *H04N 9/3182* (2013.01); *H04N 9/3194* (2013.01)

(58) Field of Classification Search
CPC ..... G03B 21/60; G03B 21/567; G02F 1/1334; G02F 1/133502; H04N 9/3182; H04N 9/3194
USPC .......................................................... 353/94
See application file for complete search history.

(56) References Cited

U.S. PATENT DOCUMENTS

| | | | |
|---|---|---|---|
| 2014/0016099 A1* | 1/2014 | Choi | ............... E04H 3/22 353/30 |
| 2016/0088270 A1* | 3/2016 | Candry | ............ G02F 1/1313 348/789 |

FOREIGN PATENT DOCUMENTS

| | | |
|---|---|---|
| JP | 2003107580 A | 4/2003 |
| KR | 1020070106238 A | 11/2007 |
| KR | 1020150100590 A | 9/2015 |

(Continued)

OTHER PUBLICATIONS

International Search Report dated Sep. 14, 2018, corresponding to International Application No. PCT/KR2017/015528.

(Continued)

*Primary Examiner* — Steven Whitesell Gordon
*Assistant Examiner* — Jerry L Brooks
(74) *Attorney, Agent, or Firm* — Hauptman Ham, LLP

(57) ABSTRACT

A multi-projection screening system may include a projection apparatus projecting an image, a plurality of projection surfaces onto which the image is projected, a polymer dispersed liquid crystal (PDLC) panel disposed in some of the plurality of projection surfaces, and a server controlling the PDLC panel. A method of controlling a PDLC panel may include the steps of checking whether an image is projected onto the PDLC panel and controlling a color displayed on the PDLC panel. A multi-projection screening method may include the steps of projecting an image onto a projection surface disposed in the front of a theater, checking whether an image is projected onto a PDLC panel, and controlling a color displayed on the PDLC panel. In accordance with embodiments of the present invention, a totally uniform image can be provided, and a sense of difference between front and side projection images can be prevented from occurring.

12 Claims, 10 Drawing Sheets

(56) References Cited

FOREIGN PATENT DOCUMENTS

| KR | 1020160028234 A | 3/2016 |
| KR | 10-2017-0089833 A | 8/2017 |

OTHER PUBLICATIONS

Korean Office Action issued on Dec. 18, 2018, in connection with the Korean Patent Application No. 10-2017-0174536.

* cited by examiner

MULTI-PROJECTION SCREENING SYSTEM AND METHOD USING POLYMER-DISPERSED LIQUID CRYSTAL PANEL

CROSS-REFERENCE TO RELATED APPLICATION

The present application claims the benefit of Korean Patent Application No. 10-2017-0174536 filed in the Korean Intellectual Property Office on Dec. 18, 2017, the entire contents of which are incorporated herein by reference.

This work was supported by Institute for Information & communications Technology Promotion (IITP) grant funded by the Korea government (MSIT) (No. 20160003490022003, Development of a Multi-screen Movie Theatre System and Immersive Content).

TECHNICAL FIELD

The present invention relates to a multi-projection screening system and method using a polymer-dispersed liquid crystal panel.

BACKGROUND ART

IN ORDER TO PLAY BACK AN IMAGE, SUCH AS A MOVIE or advertisement, in a theater, a two-dimensional (2D) image is projected onto a single screen disposed in the front of the theater. However, in such a system, audiences inevitably watch only a 2D image.

A three-dimensional (3D) image-related technology capable of providing audiences with an image having a sense of 3D effect is recently developed.

The 3D image technology is based on the principle that if different images are input to the left eye and right eye of a person and combined in the brain, the person can feel a 3D effect in a 2D image. Two cameras on which different polarization filters have been mounted are used to capture images. Upon watching the images, a person wears glasses having polarization filters mounted thereon so that different images can enter the left eye and right eye of the person. However, such a 3D technology is merely a technology which can provide a user with a 3D-effect image, but enables a user to merely watch an image played back on a single screen and thus has a poor feeling of immersion into an image itself.

Furthermore, this 3D technology has a limit in that the direction of a 3D effect felt by audiences is limited to the direction in which a single screen is present.

The trend is to develop a multi-projection screening system in order to provide audiences with an image providing a more feeling of immersion.

The multi-projection screening system includes a plurality of projection surfaces, and images projected onto the plurality of projection surfaces must be integrated and corrected. Accordingly, a multi-projection screening system and multi-projection screening method including elements for such correction are developed.

DISCLOSURE

Technical Problem

An embodiment of the present invention provides a multi-projection screening system and method having a sense of uniformity and a sense of unity.

An embodiment of the present invention provides a multi-projection screening system and method capable of preventing a sense of difference between front and side projection images.

Technical Solution

A multi-projection screening system according to an embodiment of the present invention may include a projection apparatus projecting an image, a plurality of projection surfaces onto which the image is projected, a polymer dispersed liquid crystal (PDLC) panel disposed in some of the plurality of projection surfaces, and a server controlling the PDLC panel. The projection surface may be disposed in at least any one place of front, left and right sides, ceiling surface and floor surface of a theater and may include an interior surface or a screen. The PDLC panel may be attached to at least any one place of the front, left and right sides, top surface and bottom surface of the theater.

The projection surface in which the PDLC panel is disposed may be the interior surface.

At least one of white, gray and dark gray similar to the color of the projection surface disposed in the front of the theater may be displayed on the PDLC panel.

The color of the PDLC panel may be slowly displayed or changed over specific time.

The server may control the PDLC panel depending on whether an image is projected or not. The PDLC panel may include a first state and a second state depending on whether an image is projected or not.

The PDLC panel may be disposed in a region other than a masking region.

The first state may include the state in which the PDLC panel is transparent. The second state may be the state in which the PDLC panel displays a color not having a sense of difference between the PDLC panel and the projection surface disposed in the front of a theater so that an image is projected onto the PDLC panel.

The PDLC panel of the second state may display a color similar to the color of the projection surface disposed in the front of the theater.

The PDLC panel of the second state may display the natural color of the PDLC panel.

The PDLC panel may be disposed in a region including a masking region.

The first state may be a state in which the PDLC panel is transparent. In the second state, a region in which the PDLC panel is be disposed in the masking region may be the transparent state, and a color not having a sense of difference between the PDLC panel and the projection surface disposed in the front of the theater may be displayed in a region other than the masking region.

A color identical with or similar to the color of the projection surface disposed in the front of the theater may be displayed in the region other than the masking region of the PDLC panel of the second state.

The natural color of the PDLC panel may be displayed in the region other than the masking region of the PDLC panel of the second state.

An anti-diffused reflection film or coating layer for preventing diffused reflection may be disposed on a surface of the PDLC panel.

The PDLC panel may be coated with paints for preventing diffused reflection.

The PDLC panel may include a member for preventing a howling phenomenon.

The member may include a plurality of holes. The plurality of holes may be disposed at specific intervals.

A method of controlling a PDLC panel according to an embodiment of the present invention may include the steps of checking whether an image is projected onto the PDLC panel and controlling a color displayed on the PDLC panel.

The method may further include the step of displaying a color not having a sense of difference between the PDLC panel and a projection surface disposed in the front of a theater on the PDLC panel when the image is projected onto the PDLC panel.

The method may further include the step of the PDLC panel switching to a transparent state if an image is not projected onto the PDLC panel.

A multi-projection screening method according to an embodiment of the present invention may include the steps of projecting an image onto a projection surface disposed in the front of a theater, checking whether an image is projected onto a polymer dispersed liquid crystal (PDLC) panel, and controlling a color displayed on the PDLC panel.

The method may further include the steps of displaying a color not having a sense of difference between the PDLC panel and the projection surface disposed in the front of the theater on the PDLC panel when the image is projected onto the PDLC panel, and projecting an image onto the PDLC panel.

The method may further include the step of the PDLC panel switching to a transparent state if an image is not projected onto the PDLC panel.

Advantageous Effects

The present invention can prevent a sense of difference between front and side projection images from occurring.

According to the present invention, a totally uniform image can be provided.

Effects which may be obtained by the embodiments of the present invention are not limited to the aforementioned effects, and other effects not described above may be evidently derived and understood by a person having ordinary skill in the art to which the present invention pertains from the following description of the embodiments of the present invention.

Figure 1:
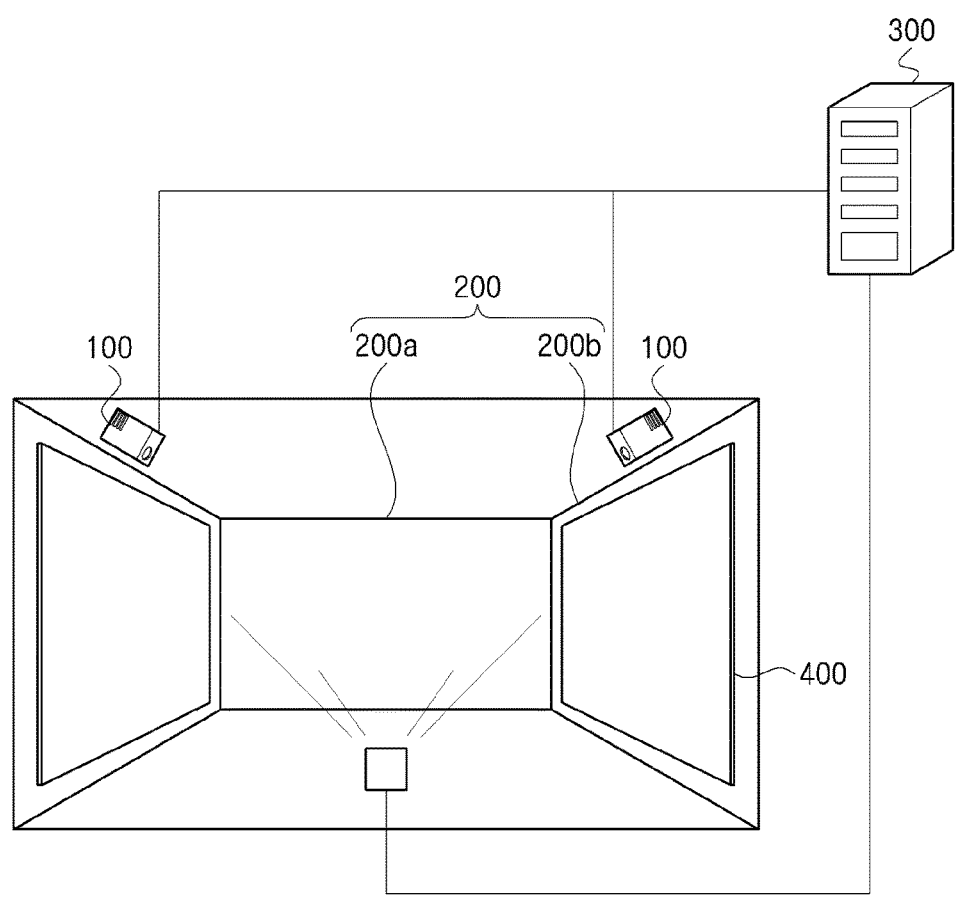
FIG. 1 schematically shows the configuration of a multi-projection screening system according to an embodiment of the present invention.

| <Description of reference numerals> | |
|---|---|
| 100: | projection apparatus |
| 200: | projection surface |
| 200a: | first projection surface |
| 200b: | second projection surface |
| 242: | power supply unit |
| 244: | control unit |
| 246: | member |
| 300: | server |

MODE FOR INVENTION

The details of the objects and technical configurations of the present invention and acting effects thereof will be more clearly understood from the following detailed description.

In describing embodiments of the present invention, terms, such as "the first" and "the second", are merely used to distinguish between the same or corresponding elements, and the same or corresponding elements are not restricted by the terms, such as "the first" and "the second."

An expression of the singular number includes an expression of the plural number unless clearly defined otherwise in the context. In this specification, a term, such as "include (or comprise)" or "have", is intended to designate the presence of a characteristic, number, step, operation, element or part described in the specification or a combination of them, and may be construed as including one or more other characteristics, numbers, steps, operations, elements, parts or combinations of them.

Terms, such as "include (or comprise)" and/or "including (or comprising)" used in the specification, do not exclude the existence or addition of one or more elements, steps, operations and/or devices in the described elements, steps, operations and/or devices.

Hereinafter, a multi-projection screening system and method according to embodiments of the present invention are described with reference to the accompanying drawings.

In the detailed description, an "image" may include a moving image in addition to a still image.

In the detailed description, a "projection surface disposed in the front of a theater" may be interchangeably used with a "first projection surface", for convenience of description. A multi-projection screening system according to an embodiment of the present invention is described below with reference to FIG. 1.

The multi-projection screening system according to an embodiment of the present invention includes a projection apparatus 100, a plurality of projection surfaces 200, a polymer dispersed liquid crystal (PDLC) panel 400, and a server 300.

The number of projection apparatuses 100 is one or more, and the projection apparatus means an apparatus for projecting an image onto the projection surfaces 200.

The projection apparatuses 100 may have heat generation units, such as an optical system and may enlarge and project images onto screens. The projection apparatus may be implemented in various manners.

For example, the projection apparatus 100 may be implemented according to a method using a cathode ray tube (CRT), a method using a liquid crystal display (LCD) and a digital light processing (DLP) method using a digital micromirror device (DMD) chip. The projection apparatus 100 may be implemented in various manners in addition to the aforementioned methods.

The projection apparatuses 100 have been illustrated as projecting images onto a single screen, but the present invention is limited thereto.

Furthermore, the plurality of projection apparatuses 100 is synchronized, and may project images capable of providing a sense of unity to audiences.

Audiences can recognize a synchronized image of images projected by the plurality of projection apparatuses 100 at various points of time through the synchronization.

Accordingly, a sense of 3D effect and a feeling of immersion felt by audiences can be improved through such recognition.

The plurality of projection apparatuses 100 may selectively operate. Through the selective operation, a synchronized image may be projected onto a first projection surface 200a and the entire PDLC panel 400, a synchronized image may be projected onto the first projection surface 200a and part of the PDLC panel 400, or a synchronized image may be projected onto only the first projection surface 200a.

Furthermore, through the selective operation, a synchronized image may be projected onto all of the plurality of projection surfaces 200, a synchronized image may be projected onto a projection surface 200a disposed in the front of the theater and only some left and right sides, top and bottom of a theater, or a synchronized image may be projected onto only the projection surface 200a disposed in the front of the theater.

The projection surface 200a disposed in the front of the theater is described as the first projection surface 200a, for convenience of description.

The projection apparatuses 100 may generate a dynamic visual effect by alternately performing such operations.

The projection apparatus 100 may be connected to a server 300 in a wired manner, but the present invention is not limited thereto.

For example, the projection apparatus 100 may be wirelessly connected to the server 300.

Furthermore, the projection apparatus 100 may receive information about an image projected onto the projection surfaces 200 from the server 300.

The projection surfaces 200 are configured in a plural number, and the projection apparatuses 100 project images onto the projection surfaces 200.

The projection surfaces 200 may include a screen and an interior surface, but the present invention is not limited thereto.

The projection surfaces 200 may be disposed at one or more of the front, both sides, top (or ceiling surface) and bottom (or floor surface) of a theater on the basis of the seats.

The projection surface 200a disposed in the front of the theater may be formed of a screen.

The PDLC panel 400 may be attached to a projection surface 200b, that is, some of the plurality of projection surfaces 200.

The projection surface 200b to which the PDLC panel 400 is attached may be the interior surface of a theater.

The PDLC panel 400 may be disposed at any place of the left and right sides, top (ceiling surface) and bottom (floor surface) of a theater.

Figure 2:
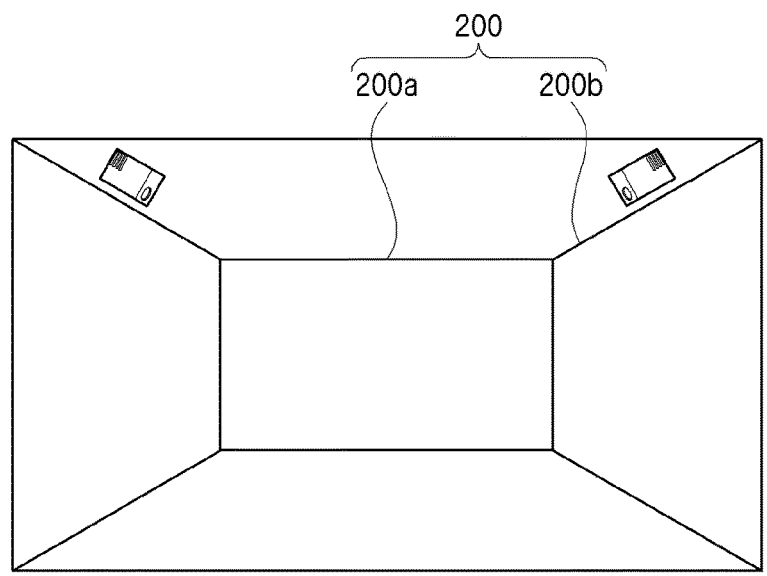
FIG. 2 is a diagram for illustrating regions in which PDLC panels are disposed in accordance with an embodiment of the present invention.

Referring to FIG. 2, the PDLC panel 400 according to an embodiment of the present invention has been illustrated as being disposed on the left and right sides of a theater, but the present invention is not limited thereto.

If the PDLC panels 400 are disposed on the left and right sides 200b of a theater and images are projected onto the PDLC panels 400, a color not having a sense of difference is displayed on the first projection surfaces 200a, thereby being capable of preventing a sense of difference between front and side projection images.

A sense of difference between front and side projection images can be prevented because the PDLC panels 400 are disposed on the left and right sides 200b of a theater.

Furthermore, when an image is not projected onto the PDLC panel 400, the PDLC panel 400 becomes transparent. Accordingly, light is not reflected by the PDLC panel 400 because the color of the interior surface of a theater is seen.

Accordingly, when an image is not projected onto the PDLC panel 400, light is not reflected by the PDLC panel 400 while audiences watch an image on the projection surface 200a disposed in the front of the theater, thereby being capable of improving a degree of immersion of audiences.

The PDLC panel 400 may be disposed on the side 200b of a theater in the form of a single PDLC panel 400 or may be disposed in a form in which a plurality of the PDLC panels 400 has been connected, but the present invention is not limited thereto.

The elements of the PDLC panel 400 are described below with reference to FIG. 3.

Figure 3:
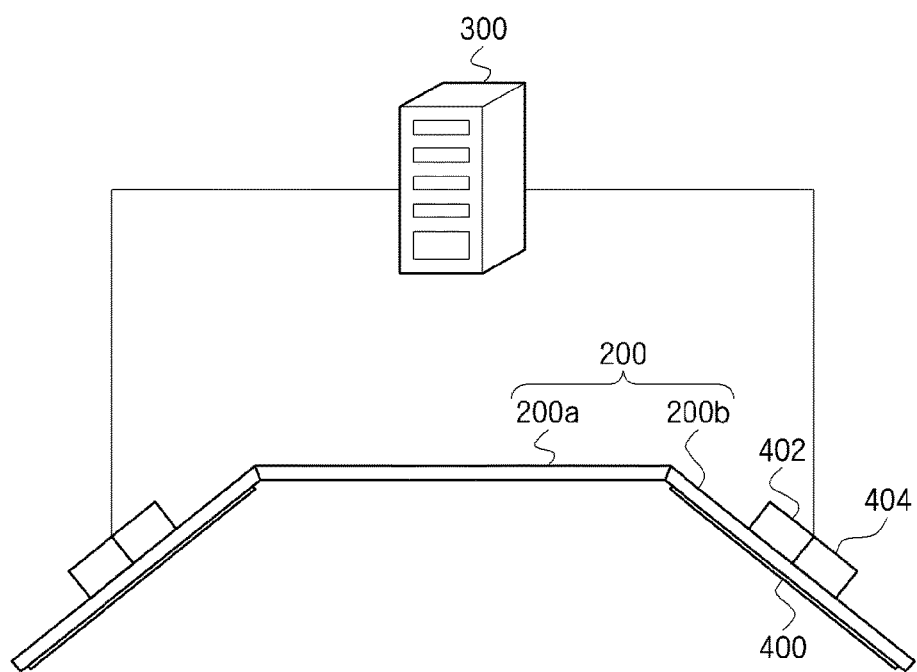
FIG. 3 schematically shows the configuration of the PDLC panel according to an embodiment of the present invention.

Referring to FIG. 3, the PDLC panel 400 includes a power supply unit 402 and a control unit 404 embedded in the PDLC panel 400 or disposed on the outside.

For example, the power supply unit 402 and the control unit 404 may be buried in the ceiling or wall of a theater so that they are not seed by audiences, but the present invention is not limited thereto.

The power supply unit 402 is electrically connected to the PDLC panel 400 and may supply power thereto.

In order for the PDLC panel 400 to perform a function, the power supply unit 402 needs to continue to supply power.

In describing embodiments of the present invention, it is assumed that the PDLC panel 400 continues to be powered by the power supply unit 402.

The control unit 404 controls an overall operation of the PDLC panel 400.

Furthermore, the control unit 404 may perform other control through wired/wireless communication with the projection apparatus 100 and the server 300.

The wired/wireless communication may be performed by a network for a wired connection, such as a universal serial bus (USB), composite video banking sync (CVBS), components, S-video (analog), a digital visual interface (DVI), a high definition multimedia interface (HDMI), RGB and D-SUB, communication standards to protocols for the network, and a network for a wireless connection, such as Bluetooth, radio frequency identification (RFID), infrared data association (IrDA), a ultra wide band (UWB), Zigbee, digital living network alliance (DLNA), a wireless LAN (WLAN) (Wi-Fi), a wireless broadband (Wibro), world interoperability for microwave access (Wlmax), high speed living downlink packet access (HSDPA), long term evolution/LTE-advanced (LTE/LTE-A) and Wi-Fi direct, and communication standards to protocols for the network.

The PDLC panel 400 has a first state and a second state depending on whether an image is projected onto the PDLC panel 400.

The first state and second state of the PDLC panel 400 is described below with reference to FIG. 4.

The PDLC panel 400 may have the first state and the second state depending on whether an image is projected onto the PDLC panel 400.

Figure 4A:
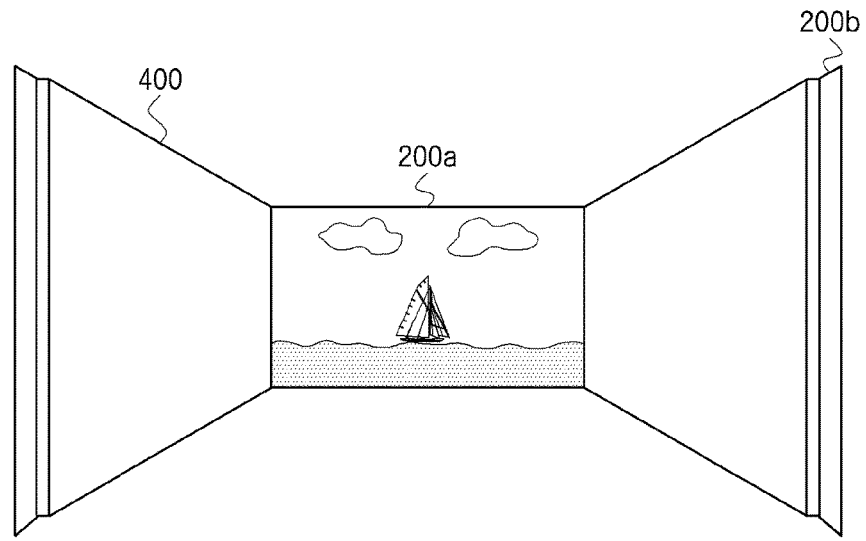
FIG. 4a is a diagram for illustrating the first state of the PDLC panel according to an embodiment of the present invention.

The control unit 404 may receive data from the server 300 and control the first state and second state of the PDLC panel 400. Referring to FIG. 4(a), the control unit 404 may receive data from the server 300 and control a color displayed on the PDLC panel 400.

Figure 4B:
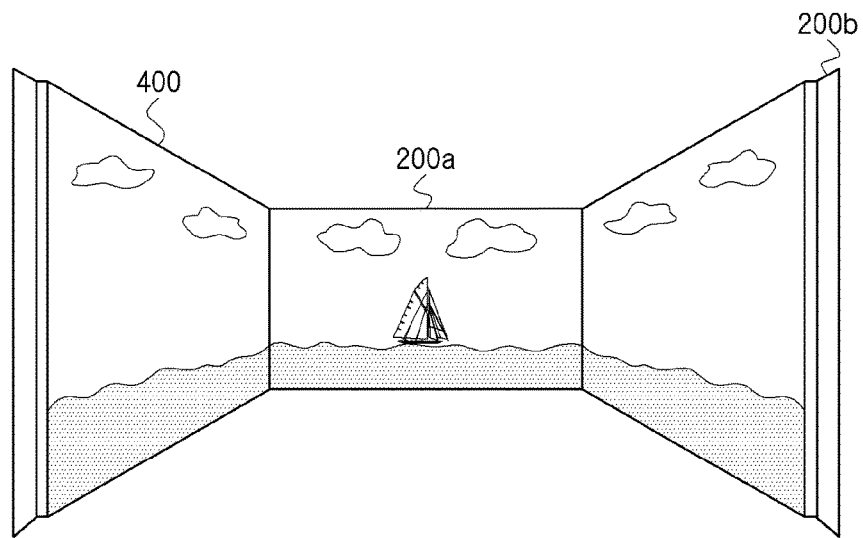
FIG. 4b is a diagram for illustrating the second state of the PDLC panel according to an embodiment of the present invention.

The PDLC panel 400 may be transparent or display the same color as the interior surface of a theater (the first state). Referring to FIG. 4(b), the control unit 404 may receive data from the server 300 and display a color not having a sense of difference between the PDLC panel 400 and the first projection surface 200a through the projection apparatus 100 (the second state).

When an image (or information) is received from the projection apparatus 100, the control unit 404 may control the PDLC panel 400 so that it automatically performs an operation of switching to the second state.

In other words, the PDLC panel 400 has the first state and the second state. The first state may be the state in which the PDLC panel 400 is a transparent state or has the same color as the interior surface of a theater.

When an image is not projected onto the PDLC panel 400, audiences are not prevented from watching an image owing to the PDLC panel 400 of the first state.

Audiences can watch an image projected onto the PDLC panel 400 through the PDLC panel 400 of the second state.

In the second state, an image with a color not having a sense of difference between the PDLC panel 400 and the first projection surface 200a may be projected onto the PDLC panel 400.

An image having a sense of general unity may be projected onto the PDLC panel 400 because a color not having a sense of difference between the PDLC panel 400 and the first projection surface 200a is displayed.

In this case, a color identical with or similar to that of the first projection surface 200a may be displayed on the PDLC panel 400.

For example, at least one of white, gray and dark gray similar to that of the first projection surface 200a in the front may be displayed on the PDLC panel 400. In one embodiment, in the case of white, the color of the PDLC panel may be R 255, G 255 or B 255 (in HEX marks, #FFFFFF). In the case of gray, the color of the PDLC panel may be R 128, G 128 or B128 (in HEX marks, #808080).

Hereinafter, a case where the present invention is applied to a theater in which the surfaces of walls 200b on both sides are dark gray and a silver screen (ivory) has been disposed at the center of the front is described as an example.

If the first projection surface 200a is the silver screen (ivory), the PDLC panel 400 (ivory) having a similar color to the silver screen may be disposed on the surfaces of walls 200b on both sides of the theater. That is, if the silver screen having ivory color has been disposed at the center of the theater, the PDLC panel 400 having ivory color similar to that of the first projection surface 200a is disposed on the surfaces of walls on both sides of the theaters.

An operation if advertisement or a movie of multi-projection screening is projected onto the above theater is described below. When an image is projected onto only the first projection surface 200a, the PDLC panels 400 disposed on the surfaces of walls become the first state and thus transparent. Furthermore, when an auxiliary image associated with the first projection surface 200a is projected onto the surfaces of walls on both sides of the theater along with a main image, the PDLC panels 400 disposed on the surfaces of walls change into their natural colors (i.e., the same or similar color to the first projection surface 200a). Thereafter, the projection apparatuses project auxiliary images onto the PDLC panels 400. In accordance with the embodiment of the present invention described above, when auxiliary images are projected, the properties of the auxiliary projection surfaces on both sides of a theater are changed similar to the properties of the first projection surface 200a. Accordingly, there is an advantage in that a smooth image not having a sense of difference is projected. Furthermore, when an auxiliary image is not projected, the surfaces of walls on both sides maintain the dark gray state because the PDLC panel 400 becomes the transparent state. That is, when a main image is projected, there is an advantage in that the PDLC panel 400 maintains the dark state so that audiences can be concentrated on the first projection surface 200a.

In the embodiment, an example in which the PDLC panel 400 of ivory has been attached to the surfaces of walls has been illustrated, but it is evident that the color of the PDLC panel 400 and a method of manipulating the PDLC panel 400 may be changed in various manners.

When audiences watch a movie, they have to concentrate on the projection surface 200a disposed in the front of a theater. If the PDLC panels 400 disposed on the surfaces of walls on both sides of the theater suddenly switch from the first state to the second state and vice versa, the audiences may not be immersed into the movie because the audiences' eyes are directed toward the surfaces of walls on the sides.

In other words, if the PDLC panel 400 frequently switch from the first state to the second state and vice versa, this may hinder audiences' movie watching. In order to prevent such a problem, the control unit 404 may control the first state and second state of the PDLC panel 400 at specific time intervals. In controlling the first state and second state of the PDLC panel 400, the control unit 404 may control the time taken to fully switch to the first state or the second state.

For example, if a total screening time of image information of the first projection surface 200a is 1 hour 20 minutes and 1 minute 00 second to 3 minutes 00 second of the screening time of the image information corresponds to the time taken for an image to be projected onto the PDLC panel 400, the PDLC panel 400 may switch to the second state so that it gradually becomes opaque (i.e., a color similar to that of the projection surface disposed at the front) over 2 seconds from 58 seconds to 1 minute 00 second.

Furthermore, the PDLC panel 400 may gradually become transparent from 3 minutes 00 second to 3 minutes 02 seconds and thus switch to the first state.

Referring back to FIGS. 1 and 3, the server 300 manages images projected by the plurality of projection apparatuses 100.

The server 300 may generally manage images projected by the projection apparatuses 100. The server 300 may determine images to be projected by the respective projection apparatuses 100 and transmit the determined images to the projection apparatuses 100.

The server 300 may manage images projected by the plurality of projection apparatuses 100 using various methods, such as a method of storing images to be projected by the projection apparatuses 100 in a database and transmitting the stored images to the projection apparatuses, a method of generating images to be projected by the projection apparatuses 100 in real time and transmitting the generated images to the respective projection apparatuses 100, and a method of receiving images to be projected by the projection apparatuses 100 from the outside in real time and transmitting the received images to the respective projection apparatuses 100. The server 300 stores images to be projected by the projection apparatuses 100 and screening time information of the images. The server 300 stores an image projected onto the first projection surface 200a and screening time information of the image, and stores an image projected onto the PDLC panel 400, the time when the image is projected and screening time information of the image.

For example, the server 300 may store time code corresponding to a screened image.

An image may be screened on the projection surface 200 in the form of 24 frames per second through the projection apparatus 100.

The frame is a still image of an image, and each frame has time code.

The time code may include image information and screening time information of a corresponding image.

Image information stored in the server 300 may have the type and format of data different from screened image information. For example, if a stored image has a multi-projection screening-dedicated container format file developed for a multi-projection image, screening time information for an image projected onto the PDLC panel 400 is included in metadata. The screening time information includes total screening time information (e.g., a total running time 60 minutes 00 second 00 frame) and information about points of time (e.g., a total of three times of playback from 0 second 10 minutes 00 second 00 frame to 20 minutes 00 second 00 frame or from 55 minutes 00 second 00 frame to 60 minutes 00 second 00 frame) at which the image is projected onto the PDLC panel 400 based on the total screening time information.

If a stored image has a commercial container format, such as AVI, MP4 or MOV, it includes total screening time information for an image projected onto the PDLC panel 400.

In the case of an image having a format other than the aforementioned multi-projection screening-dedicated container, screening time information for an image projected onto the PDLC panel 400 may have a format, such as "TXT" or "XML."

The PDLC panel 400 according to an embodiment of the present invention is described in detail below with reference to FIGS. 5 to 8.

Referring to FIG. 5, a region in which the PDLC panel 400 is disposed may be configured based on a guide image.

The PDLC panel 400 may be attached to a region onto which an image is actually projected based on the guide image.

To deploy the PDLC panel 400 on a projection surface configured based on the guide image may be taken into consideration.

The arrangement plan of a single PDLC panel 400 or a plurality of PDLC panels 400 may be determined based on the guide image. The guide image may be generated by the server 300. The server 300 may further include a separate element so as to generate the guide image.

Figure 6:
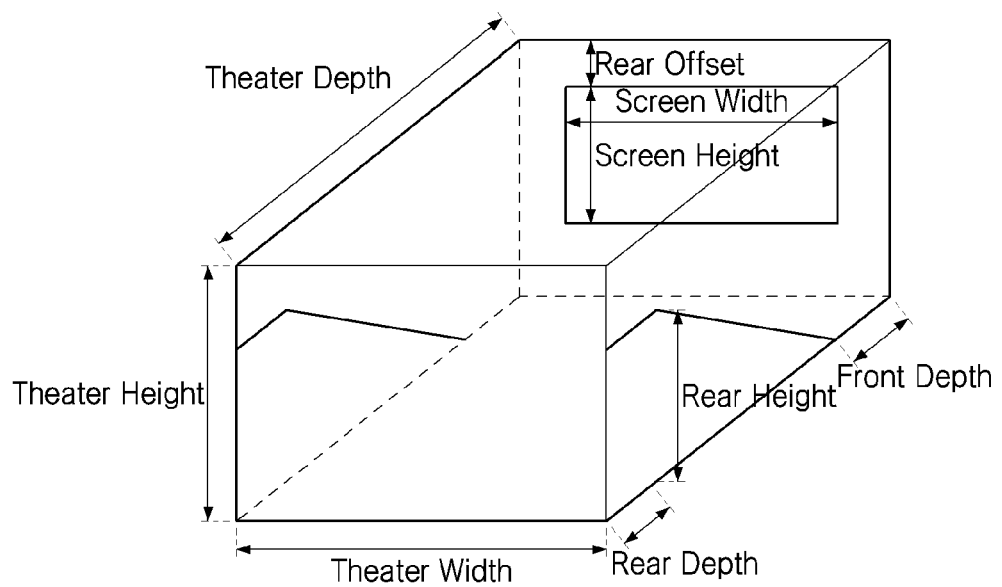
FIG. 6 is a diagram for illustrating parameters for generating a guide image according to an embodiment of the present invention.

For example, the server 300 may include a guide image generation unit and a computation unit and may optionally include an element for performing a corresponding function. Parameter values may be used to generate the guide image for configuring the region in which the PDLC panel 400 is disposed. Referring to FIG. 6, the parameters indicate the structure of a multi-projection theater, and may include a parameter (theater width) indicative of the horizontal length of the front of a theater, a parameter (theater depth) indicative of the vertical length of the theater, a parameter (theater height) indicative of the height of the theater, a parameter (screen Width) indicative of the horizontal length of the first projection surface 200a, a parameter (screen ratio) indicative of a ratio of the first projection surface 200a, a parameter (screen offset) indicative of the length from the top of the first projection surface 200a to the ceiling of the theater, a parameter (front depth) indicative of the length from the first projection surface 200a to the seats, a parameter (rear depth) indicative of the horizontal length from seats at the back within the theater to the back surface of the theater, and a parameter (rear height) indicative of the height of the seats at the back within the theater.

The parameters may be databased, integrated and managed.

A guide image of the multi-projection screening system may be generated using the parameters.

The guide image may be used to configure the region of the PDLC panel 400 because ratio information between the projection surface 200a disposed at the front and the PDLC panel 400 can be checked based on the guide image.

The guide image may have a form corresponding to a planar figure in which a plurality of faces of a multi-projection theater has been exploded.

Accordingly, the detailed region information of the multi-projection theater may be expressed in a 2D information form because the guide image can be fully matched with the structure of the multi-projection theater.

Referring back to FIG. 5(a), a masking region S may be set on the left side or right side of the guide image. The region of the PDLC panel 400 may be configured by taking into consideration information of the masking region.

The masking region S functions to block the projection of an image in order to prevent audiences' dazzling when the audiences watch the image.

For example, the masking region S may be a region that blocks the projection of an image at a specific ratio or more from the sitting height of audiences by taking into consideration the sitting height of the audiences.

In the guide image, the masking region may be divided using pixel ratio information and parameters, such as a parameter indicative of the length from the first projection surface 200a to the seats, a parameter indicative of the length from the seats at the back to the back surface of a theater, and a parameter indicative of the height of the seats at the back. A corresponding region may be expressed using the vertex coordinates of the masking region.

The guide image may express the masking region S in a polygon form.

Furthermore, the guide image may specify the masking regions S included in the left and right regions, so the regions of the PDLC panels 400 may be configured by taking into consideration the masking regions.

Figure 5A:
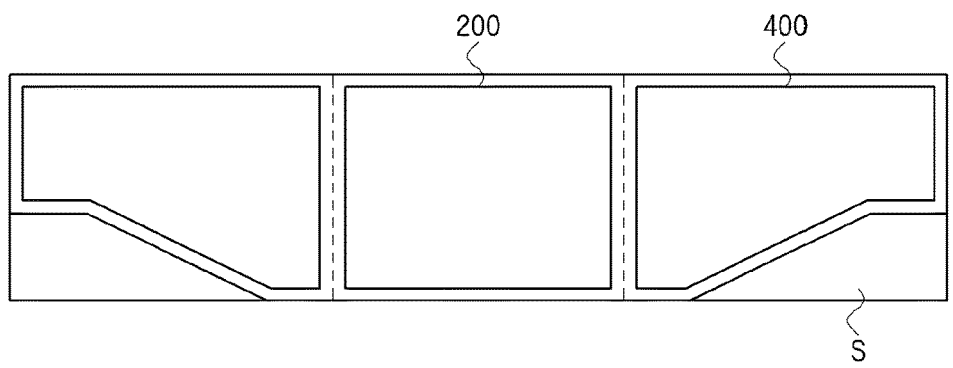
FIG. 5a is another diagram for illustrating a guide image generated to set a region in which the PDLC panel is disposed in accordance with an embodiment of the present invention.
Figure 5B:
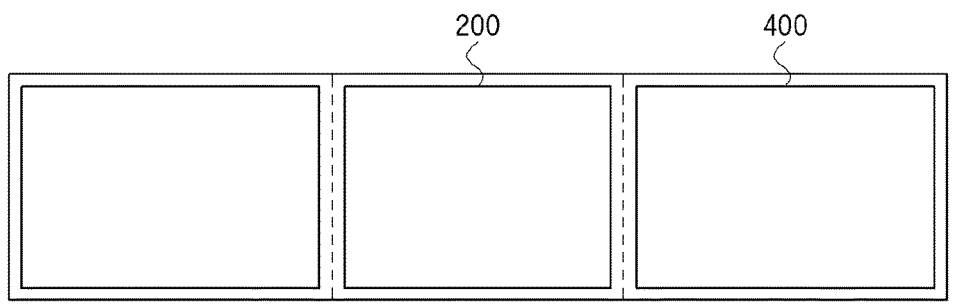
FIG. 5b is a diagram for illustrating a region in which the PDLC panel is disposed including a masking area according to embodiment of the present invention.

Referring to FIG. 5(b), the PDLC panel 400 may be disposed in the region including the masking region.

The region in which the PDLC panel 400 is disposed may be configured in the region including the masking region S based on the guide image.

Furthermore, the PDLC panel 400 may be controlled by taking into consideration the masking region S.

Figure 7A:
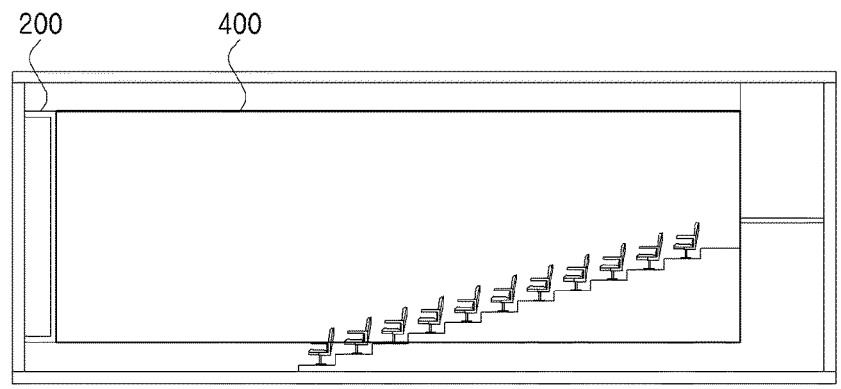
FIG. 7a is a diagram for illustrating a region in which the PDLC panel is disposed in accordance to the first embodiment of the present invention.

Referring to FIG. 7(a), the PDLC panel 400 is the same as the height of the projection surface 200a disposed at the front and is disposed in the region including the masking region S.

The PDLC panel 400 corresponding to the masking region may be controlled with reference to a guide image.

When an image is projected onto the projection surface 200a disposed at the front, the PDLC panel 400 is controlled by the masking region S with reference to a guide image, thereby being capable of preventing audiences' dazzling.

When an image is projected onto the PDLC panel 400, a color not having a sense of difference between the PDLC panel 400 and the first projection surface 200a is displayed on the PDLC panel 400. The PDLC panel 400 disposed in the masking region S may be displayed transparently.

Figure 7B:
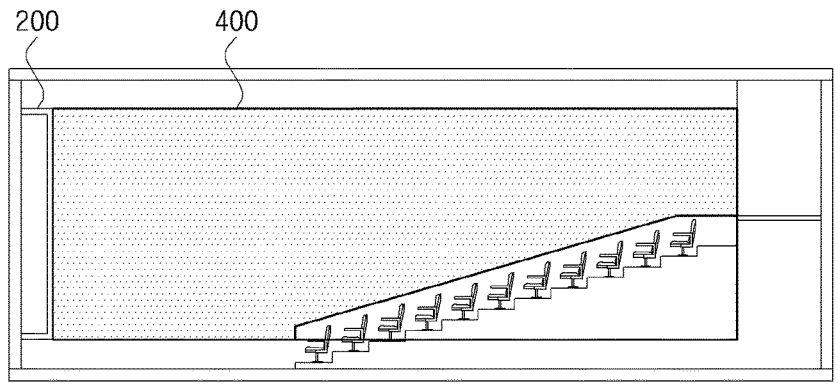
FIG. 7b is a diagram for illustrating a region in which the PDLC panel is disposed in accordance to the second embodiment of the present invention.

Referring to FIG. 7(b), the PDLC panel 400 is the same as the height of the first projection surface 200a and is disposed in a region other than the masking region S.

The PDLC panel 400 may be disposed in a portion other than the masking region S formed on the left side or right side of a theater.

The PDLC panel 400 is disposed by taking into consideration the masking region S. Accordingly, when an image is projected onto the projection apparatus 100, audiences can be prevented from being hindered by light from the projection apparatus 100 in watching the image.

Figure 7C:
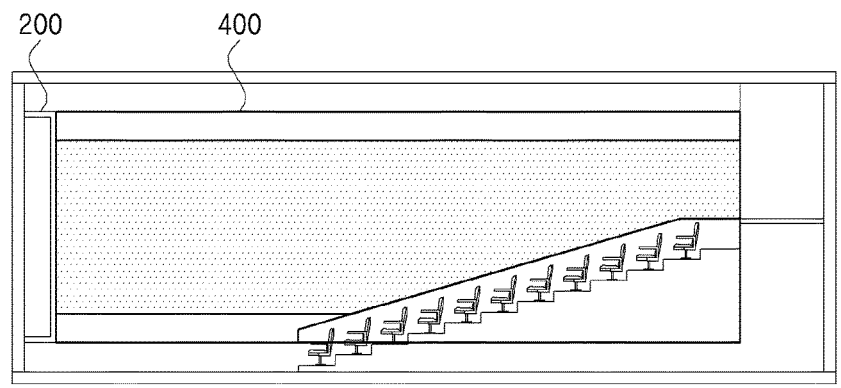
FIG. 7c is a diagram for illustrating a region in which the PDLC panel is disposed in accordance to the third embodiment of the present invention.

Referring to FIG. 7(c), the first state and second state of the PDLC panel 400 may be controlled for each pixel.

The PDLC panel 400 may be disposed by taking into consideration the height of an image projected onto the first projection surface 200a.

If the ratio of an image projected onto the first projection surface 200a is a FLAT ratio, the height of the image projected onto the first projection surface 200a may be smaller than that of the first projection surface 200a.

In this case, an image may be projected onto the PDLC panel 400 in accordance with the image projected onto the first projection surface 200a.

An image may be projected onto only part of the PDLC panel 400 by the image projected onto the first projection surface 200a. If the ratio of the first projection surface 200a is flat and the ratio of an image projected onto the first projection surface 200a is a SCOPE ratio, the height of the image projected onto the first projection surface 200a may be smaller than that of the first projection surface 200a.

In such a case, the height of an image projected onto the PDLC panel 400 may correspond to that of the image projected onto the first projection surface 200a.

An image with a color not having a sense of difference between the PDLC panel 400 and the first projection surface 200a may be displayed on part of the PDLC panel 400 onto which the image is projected.

Accordingly, the first state and second state of the PDLC panel 400 may be controlled for each pixel.

Each of the FLAT ratio and SCOPE ratio indicates the ratio of an image or screen.

The FLAT ratio is "width:height=1.85:1", and the SCOPE ratio includes a ratio of 2.35:1.

The PDLC panel 400 according to an embodiment of the present invention may further include an element for preventing diffused reflection.

An anti-diffused reflection film may be further disposed on a surface of the PDLC panel 400.

The anti-diffused reflection film functions to prevent a scratch through surface coating processing, and may be attached to a surface of the PDLC panel 400 without a bubble through a self-adsorption silicon method.

A coating layer may be further provided on a surface of the PDLC panel 400. For example, the coating layer is formed of a multi-layered sputtering metal oxide film and can prevent diffused reflection.

Anti-diffused reflection paints may be coated on a surface of the PDLC panel 400.

An anti-diffused reflection layer may be formed on a surface of the PDLC panel 400 because the anti-diffused reflection paints are coated on the PDLC panel 400.

The PDLC panel 400 according to an embodiment of the present invention may further include a member 246 for preventing a howling phenomenon.

The member 246 for preventing a howling phenomenon is described below with reference to FIG. 8.

Figure 8:
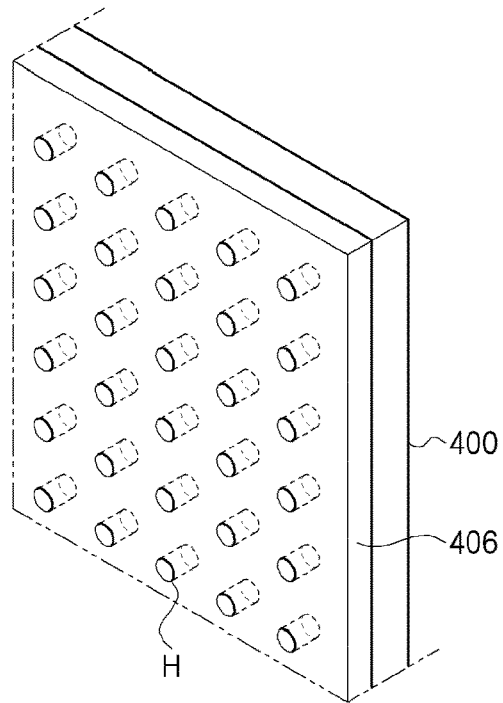
FIG. 8 is a diagram for illustrating members included in the PDLC panel according to an embodiment of the present invention.

Referring to FIG. 8, the member 246 including a plurality of holes H may be disposed on the PDLC panel 400.

A problem in that the sound of a screened image pops can be prevented because the member 246 is disposed on the PDLC panel 400.

The member 246 may be made of materials that transmit light, such as acryl or silicon, but the present invention is not limited thereto.

The hole H is configured in a plural number. The holes H may penetrate the top and bottom surfaces of the member 246.

The plurality of holes H may be disposed on the member 246 at specific intervals.

The plurality of holes H may be disposed to penetrate the member 246 in such a way as to be directed toward the top surface of the member 406.

The member 246 may include various shapes. There is no great difference in the function of the member 246 although the member 246 has any shape.

A method of controlling the PDLC panel 400 according to an embodiment of the present invention is described below with reference to FIG. 9.

Figure 9A:
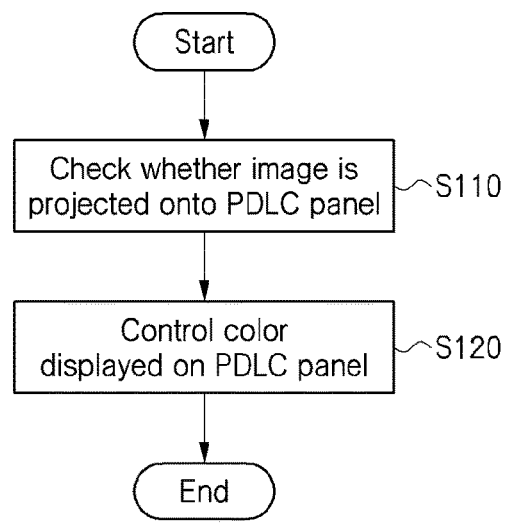
FIG. 9a is a flowchart showing part of a method of controlling a PDLC panel according to an embodiment of the present invention.
Figure 9B:
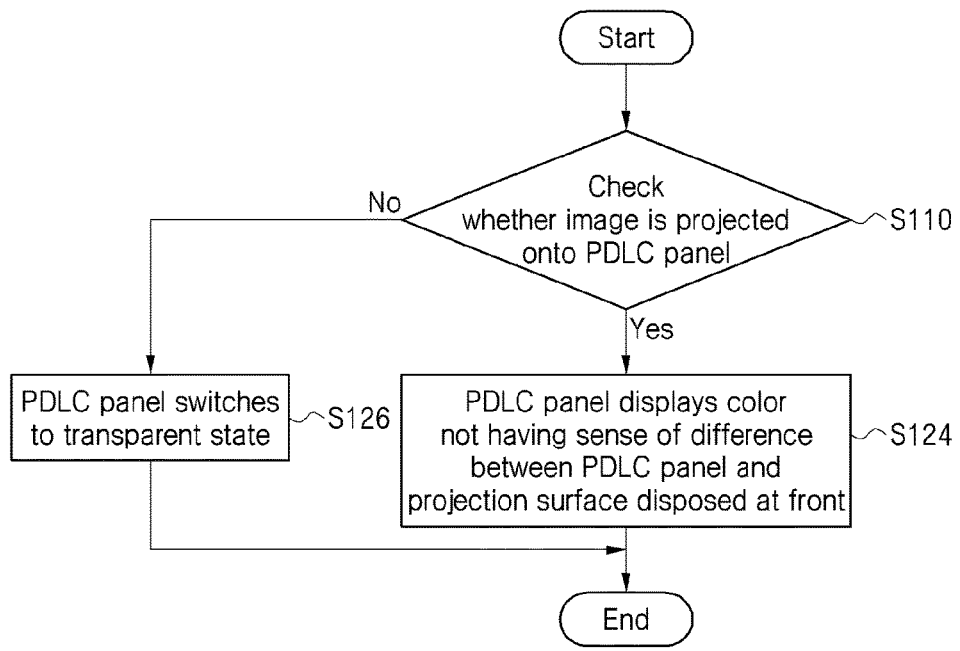
FIG. 9b is a flowchart showing controlling a PDLC panel when an image is projected on the PDLC panel according to an embodiment of the present invention.

FIG. 9 is a flowchart for illustrating a method of controlling the PDLC panel 400 according to an embodiment of the present invention.

The method is only an example in achieving the objects of the present invention, and some steps of the method may be omitted or some steps may be added to the method.

Referring to FIG. 9(a), first, whether an image is projected onto the PDLC panel 400 is checked (S110).

Whether an image is projected onto the PDLC panel 400 may be checked by receiving information of an image projected onto the PDLC panel 400 from the server 300.

The color of the PDLC panel 400 is controlled depending on whether an image is projected onto the PDLC panel 400 (S120). Referring to FIG. 9(*b*), when an image is projected onto the PDLC panel 400, an image with a color not having a sense of difference between the PDLC panel 400 and the projection surface 200*a* disposed in the front of a theater is displayed on the PDLC panel 400.

The control unit 404 performs control so that an image with a color not having a sense of difference between the PDLC panel 400 and the projection surface 200*a* disposed in the front of a theater is displayed on the PDLC panel 400.

For example, the control unit 404 may perform control so that a color similar to or identical with that of the first projection surface 200*a* is displayed on the PDLC panel 400. Furthermore, a color similar to or identical with that of the first projection surface 200*a* may be the natural color of the PDLC panel 400.

For example, a color (i.e., the natural color of the PDLC panel 400) similar to or identical with that of the first projection surface 200*a* may be at least one of white, gray and dark gray, but the present invention is not limited thereto. When an image is projected onto the PDLC panel 400, step S120 may further include step S124 in which the PDLC panel 400 displays the same color as the projection surface 200*a* disposed in the front of the theater.

The PDLC panel 400 displays a color not having a sense of difference between the PDLC panel 400 and the projection surface 200*a* disposed at the front (S124).

The PDLC panel 400 may display a color identical with or similar to that of the projection surface 200*a* disposed in the front of the theater over specific time. The control unit 404 may control the time taken for the color to be displayed.

An image having a sense of unity may be projected onto the PDLC panel 400 because a color not having a sense of difference between the PDLC panel 400 and the projection surface 200*a* disposed at the front is displayed on the PDLC panel 400.

The color of the PDLC panel 400 may change into its natural color.

The natural color of the PDLC panel 400 is a color identical with or similar to that of the first projection surface 200*a* and may be white, gray or dark gray, but the present invention is not limited thereto.

A sense of difference between front and side projection images can be offset because the PDLC panel 400 displays a color not having a sense of difference (i.e., the natural color of the PDLC panel 400) between the PDLC panel 400 and the projection surface 200*a* disposed in the front of a theater.

If an image is not projected onto the PDLC panel 400, the PDLC panel 400 may maintain a transparent state.

Furthermore, the PDLC panel 400 may display the same color as the interior surface of a theater.

Step S120 may further include step S126 in which the PDLC panel 400 switches to the transparent state.

If an image is not projected onto the PDLC panel 400, the PDLC panel 400 may switch to the transparent state (S126).

Alternatively, the PDLC panel 400 may display the same color as the interior surface of a theater.

At step S126, the PDLC panel 400 becomes transparent or displays the same color as the interior surface of a theater. Accordingly, when audiences watch an image, they can be prevented from being hindered by the PDLC panel 400.

The PDLC panel 400 may switch to or maintain the transparent state at a specific time interval. The control unit 404 may control the time taken for the PDLC panel 400 to switch to the transparent state.

A multi-projection screening method according to an embodiment of the present invention is described below with reference to FIGS. 10(10*a* and 10*b*).

Figure 10A:
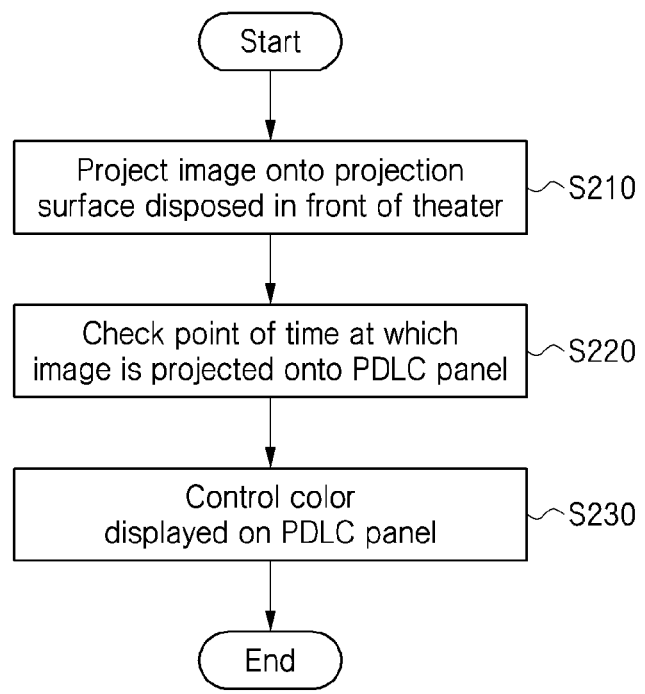
FIG. 10a is a flowchart showing part of a multi-projection screening method according to an embodiment of the present invention.
Figure 10B:
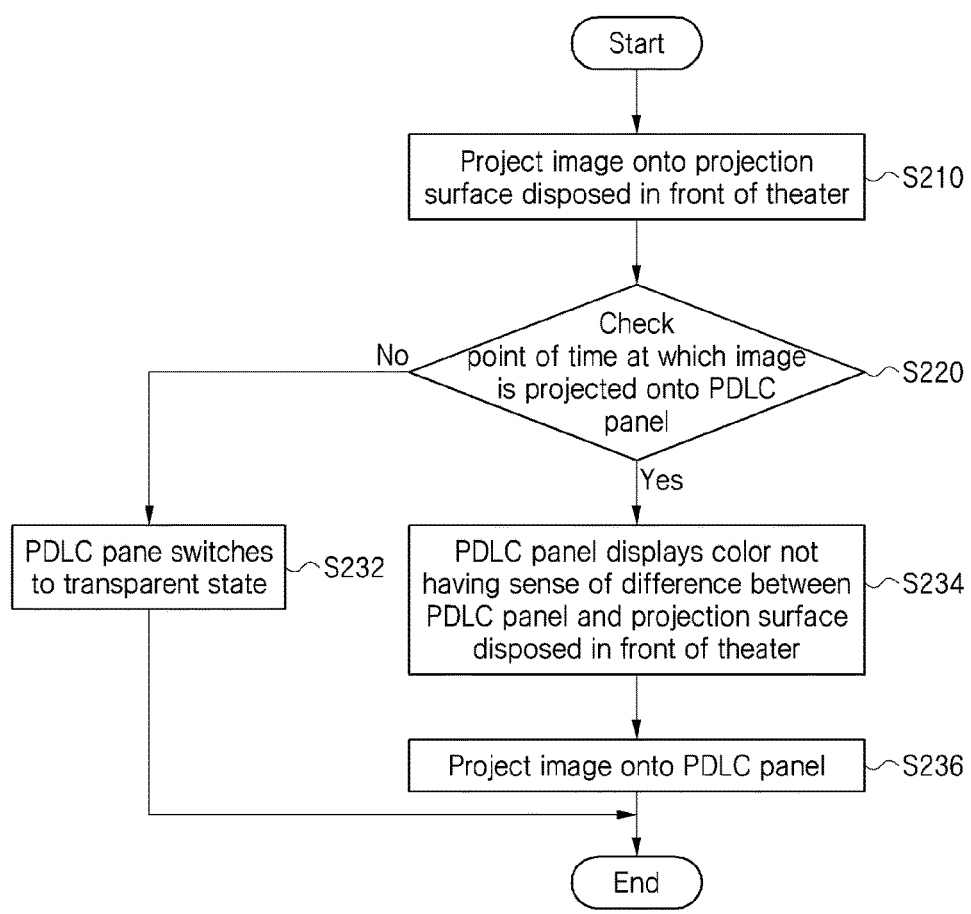
FIG. 10b is a flowchart showing of a multi-projection screening method when an image is projected on the PDLC panel according to an embodiment of the present invention.

FIG. 10 is a flowchart for illustrating a multi-projection screening method according to an embodiment of the present invention.

The multi-projection screening method is only an example in achieving the objects of the present invention, and some steps of the method may be omitted or some steps may be added to the method.

An image is projected onto the projection surface 200*a* disposed in the front of a theater (S210).

First data is received from the server 300, and the image is projected onto the first projection surface 200*a* based on the received first data.

The image may be projected onto the first projection surface 200*a* based on the first data received from the server 300.

The server 300 may include information about the image projected onto the first projection surface 200*a* and the screening time of the image and about an image projected onto the PDLC panel 400 and the screening time of the image.

The first data may be information about the image projected onto the first projection surface 200*a* and the screening time of the image.

The image may include an advertisement, a movie, a plurality of scenes or an ending credit scene.

The first data may include information about the screening time of each image.

A point of time at which the image is projected onto the PDLC panel 400 is checked (S220).

The point of time at which the image is projected onto the PDLC panel 400 is checked based on second data.

The second data is a result value in which information about the current playback time of the image projected onto the first projection surface 200*a* and information about the type of image projected onto the PDLC panel 400, the screening time of the image, and a point of time at which the image is played back by checking that the image is now played back at which point of time have been combined based on the first data.

The second data includes the type, screening time, playback time and end time of the image projected onto the PDLC panel 400 according to the screening time of the image projected onto the first projection surface 200*a*.

The color of the PDLC panel 400 is controlled depending on whether an image is projected onto the PDLC panel 400 (S230).

A different color is displayed on the PDLC panel 400 depending on whether an image is projected onto the PDLC panel 400.

If an image is not projected onto the PDLC panel 400, the PDLC panel 400 switches to the transparent state (S234).

At step S234, audiences can be prevented from being hindered by the PDLC panel 400 when watching an image because the PDLC panel 400 switches to the transparent state.

Furthermore, at step S234, the PDLC panel may display the same color as the interior surface of a theater.

Furthermore, if an image is not projected onto the PDLC panel 400, the PDLC panel 400 may becomes transparent or maintain the display of the same color as the interior surface of the theater.

The PDLC panel 400 may become transparent or display the same color as the interior surface of the theater over specific time. The control unit 404 may control the time taken for the color to be displayed.

The control unit 404 controls the PDLC panel 400 so that it displays the color for the specific time. Information about the time taken for the color to be displayed may be previously set in the control unit 404.

For example, if the time taken for the color to be displayed is two second, the control unit 404 controls the PDLC panel 400 so that it becomes transparent or displays the same color as the interior surface of the theater for two second after the end time based on the time information of the PDLC panel 400 according to the second data.

When an image is projected onto the PDLC panel 400, the PDLC panel 400 displays an image with a color not having a sense of difference between the PDLC panel 400 and the projection surface 200*a* disposed in the front of the theater.

A sense of difference between front and side projection images can be offset because the PDLC panel 400 displays an image with a color not having a sense of difference between the PDLC panel 400 and the projection surface 200*a* disposed in the front of the theater.

When an image is projected onto the PDLC panel 400, step S220 may further include step S234 in which the PDLC panel 400 displays the same color as the projection surface 200*a* disposed in the front of the theater and step S236 in which an image is projected onto the PDLC panel 400.

An image with a color not having a sense of difference between the PDLC panel 400 and the projection surface 200*a* disposed in the front of the theater is displayed on the PDLC panel 400 (S234).

If the PDLC panel 400 is disposed in a region including the masking region S, the PDLC panel 400 may switch to the transparent state in the region of the PDLC panel 400 including the masking region S.

While the PDLC panel 400 switches to the transparent state, both sides on which the PDLC panels 400 have been disposed become the same state as the interior surface of the theater and become a dark state so that audiences can concentrate on the first projection surface 200*a*.

Furthermore, the PDLC panel 400 may display the same color as the interior surface of the theater.

As described above, it is assumed that the first state and second state of the PDLC panel 400 are controlled by the control unit 404 for each pixel.

The control unit 404 may control the time that is taken for the PDLC panel 400 to display a color not having a sense of difference between the PDLC panel 400 and the projection surface 200*a* disposed in the front of the theater.

The control unit 404 may control the PDLC panel 400 so that it displays an image with the same color as the projection surface 200*a* disposed in the front of the theater at a specific interval.

The control unit 404 may previously set information about the time taken for an image with a color not having a sense of difference between the PDLC panel 400 and the projection surface 200*a* disposed in the front of the theater to be displayed on the PDLC panel 400.

For example, if the time taken for an image with a color not having a sense of difference between the PDLC panel 400 and the projection surface 200*a* disposed in the front of the theater to be fully displayed is two second, the control unit 404 controls the time taken for the image with the color not having a sense of difference between the PDLC panel 400 and the projection surface 200*a* disposed in the front of the theater to be displayed on the PDLC panel 400 for two seconds based on the time information of the PDLC panel 400 according to second data.

The image is projected onto the PDLC panel 400 (S236).

The image is projected onto the PDLC panel 400 based on the second data.

The image is projected onto the PDLC panel 400 based on screening time information of the image projected onto the PDLC panel 400 included in the second data.

The image projected onto the PDLC panel 400 may be an image synchronized with the image of the first projection surface 200*a* or an image synchronized with part of the PDLC panel 400. Although the present invention has been described as described above, a person having ordinary skill in the art to which the present invention pertains will recognize that the present invention may be implemented in other forms without departing from the technological spirit and essential characteristic of the present invention.

Although the scope of the present invention will be defined by the claims, elements directly derived from the claims and all of changed or modified forms derived from their equivalents should be construed as being included in the scope of the present invention.

The invention claimed is:

1. A multi-projection screening system in a theater, comprising:
    a plurality of projection apparatuses projecting an image;
    a plurality of projection surfaces onto which the image is projected, where the plurality of projection surfaces includes a first projection surface, which is a screen or an interior surface;
    a polymer dispersed liquid crystal (PDLC) panel disposed at one of the plurality of the projection surfaces adjacent to the first projection surface; and
    a server controlling the PDLC panel,
    wherein the PDLC panel is controlled to be switched between a first state and a second state, where the first state is a state in which the PDLC panel is transparent and the second state is a state in which the PDLC panel displays a color not having a sense of difference between the PDLC panel and the first projection surface, and
    wherein the plurality of projection apparatuses is controlled to project a main image on the first projection surface during a determined time, and is further controlled to project the main image on the first projection surface and an auxiliary image on the PDLC panel during another determined time.

2. The multi-projection screening system of claim 1, wherein
    the projection surface is further disposed in at least any one place of left and right sides, ceiling surface and floor surface of the theater and comprises an interior surface or a screen, and
    the PDLC panel is attached to at least any one place of the left and right sides, top surface and bottom surface of the theater.

3. The multi-projection screening system of claim 2, wherein the projection surface in which the PDLC panel is disposed comprises the interior surface.

4. The multi-projection screening system of claim 1, wherein at least one of white, gray and dark gray similar to a color of the first projection surface disposed in the front of the theater is displayed on the PDLC panel.

5. The multi-projection screening system of claim 1, wherein a color of the PDLC panel is slowly displayed or changed over specific time.

6. The multi-projection screening system of claim 1, wherein the server controls the PDLC panel depending on whether an image is projected or not, and the PDLC panel is switched between the first state and the second state depending on whether an image is projected or not.

7. The multi-projection screening system of claim 1, wherein the PDLC panel in the second state displays a color similar to a color of the first projection surface disposed in the front of the theater.

8. The multi-projection screening system of claim 1, wherein the PDLC panel in the second state displays a natural color of the PDLC panel.

9. The multi-projection screening system of claim 1, wherein at least one of an anti-diffused reflection film, coating layer for preventing diffused reflection, and a paint for preventing diffusion reflection is disposed on a surface of the PDLC panel.

10. The multi-projection screening system of claim 1, wherein the PDLC panel comprises a member for preventing a howling phenomenon.

11. The multi-projection screening system of claim 10, wherein the member comprises a plurality of holes, and the plurality of holes is disposed at specific intervals.

12. A multi-projection screening method, comprising:

projecting a main image on a first projection surface disposed in a front of a theater during a determined time, where the first projection surface is a screen or an interior surface, and projecting the main image on the first projection surface and an auxiliary image on a polymer dispersed liquid crystal (PDLC) panel during another determined time;

checking whether an image is projected on PDLC panel, where the PDLC panel is disposed at some of a plurality of projection surfaces adjacent to the first projection surface; and switching the PDLC panel between a first state and a second state, where the first state is a state in which the PDLC panel is transparent and the second state is a state in which the PDLC panel displays a color not having a sense of difference between the PDLC panel and the first projection surface.

* * * * *